United States Patent [19]

Sato et al.

[11] 3,996,195

[45] Dec. 7, 1976

[54] CURABLE ORGANOSILICON COMPOSITIONS

[75] Inventors: Yasuhiko Sato; Hiroshi Inomata, both of Annaka, Japan

[73] Assignee: Shinetsu Chemical Company, Tokyo, Japan

[22] Filed: Nov. 15, 1974

[21] Appl. No.: 524,220

[52] U.S. Cl. ............... 260/46.5 Y; 260/46.5 UA; 260/46.5 H; 260/825; 427/380; 427/387; 428/447

[51] Int. Cl.$^2$ ........................................ C08L 83/06

[58] Field of Search ..... 260/825, 824 EP, 46.5 UA, 260/46.5 Y, 827

[56] References Cited

UNITED STATES PATENTS

| | | | |
|---|---|---|---|
| 3,455,877 | 7/1969 | Plueddemann | 260/824 EP |
| 3,527,655 | 9/1970 | Ballard | 260/825 |
| 3,691,206 | 9/1972 | Northrup | 260/825 |
| 3,699,072 | 10/1972 | Clark et al. | 260/46.5 UA |

*Primary Examiner*—Wilbert J. Briggs, Sr.
*Attorney, Agent, or Firm*—Toren, McGeady and Stanger

[57] ABSTRACT

An improved curable organosilicon composition is formulated by blending a resin-type organopolysiloxane containing vinyl groups equivalent to 2.0 to 40 mole % of the organic groups with an organohydrogenpolysiloxane containing at least 2 hydrogen atoms directly bonded to the silicon atoms and epoxy and/or ester groups bonded to the silicon atoms through carbon atoms in the presence of a platinum catalyst, in which hydrosilation reaction takes place between the vinyl groups and the silicon-bonded hydrogen atoms to give crosslinked structure to volume cured. The compositions have a sufficiently long pot life and on curing create strong adhesion to metal, glass and ceramic and the like surfaces. The cured compositions have very high transparency and good thermal stability, and they are useful for various applications such as the manufacture of electronic parts.

11 Claims, No Drawings

CURABLE ORGANOSILICON COMPOSITIONS

FIELD OF THE INVENTION

This invention relates to novel organosilicon compositions having improved adherence and adhesiveness to the surfaces of various materials, such as metal, glass and ceramics. More particulaly, the invention relates to an organosilicon composition curable by hydrosilation reaction taking place between vinyl groups bonded to the silicon atoms of an organopolysiloxane and hydrogen atoms directly bonded to the silicon atoms of an organohydrogenpolysiloxane in the presence of a platinum catalyst.

DESCRIPTION OF THE PRIOR ART

Several types of organosilicon compositions curable by hydrosilation reaction are known; specific examples include a composition comprising an organohydrogenpolysiloxane, a vinyl group-containing organopolysiloxane and a platinum catalyst (see U.S. Pat. No. 2,915,497) and a composition in which a partial addition compound of α-methylstyrene and an organohydrogenpolysiloxane is employed as the component giving silicon-bonded hydrogen atoms (see U.S. Pat. No. 3,631,220). These prior art compositions are disadvantaged by their poor adhesion to the surfaces of certain materials such as metal, and particularly when they are used as the potting material in electronic circuitry, the coating material of electrical parts, the inpregnating material for electric motor coils and the like, a gap tends to occur between the compositions cured and the base surfaces, permitting water to intrude thereinot and deteriorating the electric properties of the treated articles.

OBJECTS OF THE INVENTION

An object of the invention is to provide an improved organosilicon compositions which is free from the above-described disadvantages and has excellent adhesive bonding to the surfaces of various materials, such as metal, glass and ceramics.

Another object of the invention is to provide an improved organosilicon composition which is curable into a rigid form having excellent transparency.

Still another object of the invention is to provide an improved organosilicon composition having a sufficiently long pot life.

SUMMARY OF THE INVENTION

The organosilicon composition of the invention comprises a. an organopolysiloxane composed of from 15 to 75 mole % of th organosiloxane units represented by the general formula $R^1SiO_{1.5}$, from 25 to 85 mole % of the organosiloxane units represented by the general formula $R^2R^3SiO$ and from 0 to 5 mole % of the organosiloxane units represented by the general formula $R^4R^5R^6SiO_{0.5}$, where $R^1$, $R^2$, $R^3$, $R^4$, $R^5$ and $R^6$ each are the same or different monovalent hydrocarbon groups, from 2.0 to 40 mole % of these hydrocarbon groups being vinyl groups, b. an organohydrogenpolysiloxane miscible with component (a), having from 2 to 6 silicon atoms in one molecule, at least 2 hydrogen atoms directly bonded to silicon atoms in one molecule and at least one of the groups selected from epoxy and ester groups bonded to the silicon atoms through carbon atoms in one molecule in an amount such that its hydrogen atoms directly bonded to the silicon atoms are from 0.7 to 1.5 times the equimolar amount of the vinyl groups contained in component (a), and c. catalytic amount of platinum or platinum compound, The composition of the invention has a sufficiently long pot life and, on cure, it has strong adhesion to the surface of metal, glass or ceramics as a highly transparent coating.

To describe the invention in further detail, the organopolysiloxane component (a) is of the resin type composed of the organosiloxane units of the specified formulae, in which the hydrocarbon group $R^1$, $R^2$, $R^3$, $R^4$, $R^5$ or $R^6$ is exemplified by methyl, ethyl, vinyl or phenyl and from 2.0 to 40 mole % of the total groups should consist of vinyl groups. The vinyl groups serve to form crosslinks between components (a) and (b) as the result of the hydrosilation reaction of the vinyl groups with the silicon-bonded hydrogen atoms contained in component (b). Contents of the vinyl groups in component (a) less than 2.0 mole % would cause an insufficient crosslinking density and consequently poor mechanical strengths to the resultant cured composition. On the contrary, higher contents of the vinyl groups than 40 mole % would cause an unduly high crosslinking density and consequently brittleness to the cured composition.

The monofunctional siloxane units of the general formula $R^4R^5R^6SiO_{0.5}$ contained 5 mole % or less in component (a) have the effect to decrease the viscosity of the component and consequently of the resultant commposition to improve the workability of the composition when used as the coating material for electronic parts of complicated shapes without worsening the properties of the composition cured.

The organopolysiloxane component (a) may be formulated according to a known methods, for example, by cohydrolysis of the mixed organochlorosilanes or organoalkoxysilanes, followed by condensation of the hydrolyzates. In this case, it is preferred that the content of the residual hydroxy groups directly bonded to the silicon atoms is limited to 2.0% or less, preferably 1.0% or less by weight, suitably by subjecting the hydrolyzate resins to polycondensation with the aid of an alkaline catalyst, such as potassium hydroxide. The degree of polymerization of the organopolysiloxane component (a) is not a liiting factor; the component may be a mixture of several organopolysiloxanes, each having a different degree of polymerization. The use of such a mixture makes it easy and convenient to lower the viscosity of the component as a whole to the desired levels or to formulate the socalled two-package systems.

When a further improvement is desired as to the workability of the composition and the properties of cured compositions, an organopolysiloxane of the linear molecular structure having at least one vinyl group directly bonded to silicon atoms in one molecule may be employed together with component (a). This additional component, now being referred to as (a′), is represented by the general formula

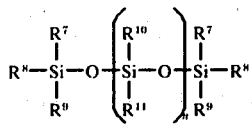

where $R^7$, $R^8$, $R^9$, $R^{10}$ and $R^{11}$ are each the same or different monovalent hydrocarbon groups, exemplified by methyl, ethyl, vinyl and phenyl groups and n is an integer of from 0 to 100.

This organopolysiloxane component (a′) should be miscible with component (a). The vinyl groups contained in component (a′), as in component (a), function to prevent their separation from the cured composition by chemically bonding the molecules of this component (a′) to the molecules of the organohydrogenpolysiloxane component (b) through the hydrosilation of the vinyl groups with the silicon-bonded hydrogen atoms contained in component (b).

Some examples of component (a′) are compounds of the following structural formulae.

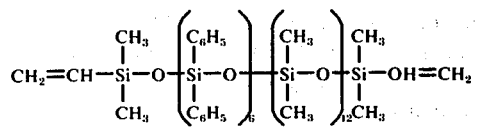

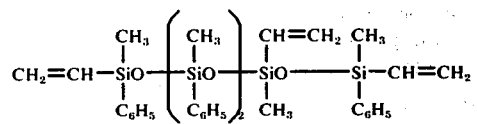

It is preferred that the vinyl groups are bonded only to the terminal silicon atoms in component (a′) when some flexibility is desired in the cured composition.

The component (a′) may be used in an amount less than 100 parts, preferably 50 parts, by weight per 100 parts by weight of component (a). The effect of component (a′) in the composition is the improvement of the workability due to the reduced viscosity of the composition and the optimized curing time or the improvement of the mechanical properties of the cured composition with respect to flexibility and anti-cracking.

The organohydrogenpolysiloxane component (b) serves as a crosslinking agent. in order to attain good adhesiveness to the surfaces of various materials, such as metal, glass and ceramics, this component should have epoxy and/or ester groups bonded to silicon atoms through carbon atoms in the molecule. The mechanism to enhance the adhesiveness by the presence of the epoxy and/or ester groups is not clear, although it may be a possible explanation that the large polarity of the epoxy and ester groups takes part effectively.

The component (b) has preferably a boiling point as high as possible, since a lower boiling point will cause an accelerated evaporation to the component, resulting in the insufficient cure of the composition. On the other hand, any organohydrogenpolysiloxanes of higher polymerization degrees, say, having 7 or more of silicon atoms per molecule will give such disadvantages as unfavorable viscosity and curing velocity to the composition and improper crosslinking density and a crosslinked network structure causing inferior mechanical strengths to the cured composition. Besides, those organohydrogenpolysiloxanes can hardly be obtained commercially. These situations lead to bring about the limitation that the suitable organohydrogenpolysiloxane component (b) has from 2 to 6 silicon atoms in one molecule.

Some examples of component (b) are compounds of the following structural formulae:

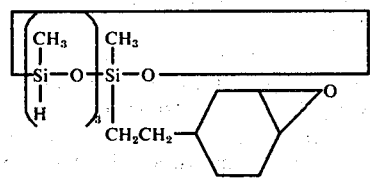

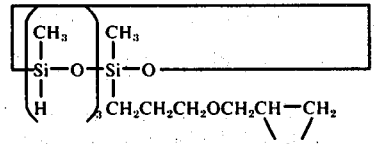

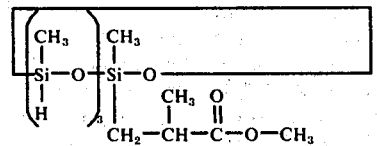

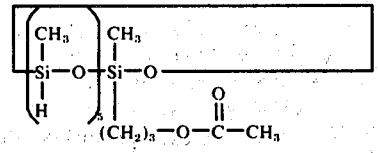

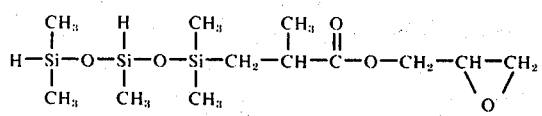

The organohydrogenpolysiloxane component (b) may be prepared by partial addition reaction between an organohydrogenpolysiloxane having at least 3 silicon-bonded hydrogen atoms per molecule and an epoxy or ester compound having an olefinically unsaturated double bond per molecule in the presence of a platinum catalyst. In this case, the organohydrogenpolysiloxanes are exemplified by cyclic methylhydrogenpolysiloxanes having the general formula

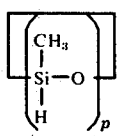

where $p$ is an integer from 3 to 6 and linear methylhydrogenpolysiloxanes terminated at both chain ends with dimethylhydrogensilyl groups having the general formula

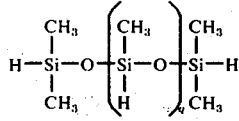

where $q$ is an integer from 1 to 4, or trimethylsilyl groups having the general formula

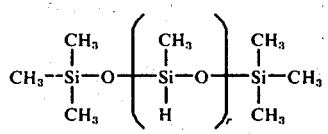

where $r$ is 3 or 4, while the epoxy or ester compounds are exemplified by compounds having the following structural formulae.

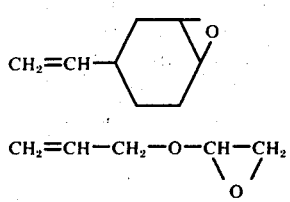

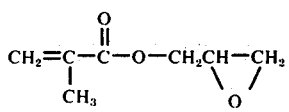

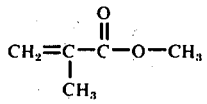

-continued

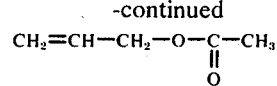

When it is intended to prevent cured compositions from becoming more brittle due to the use of an epoxy group-containing organohydrogenpolysiloxane as component (b) and consequently to excessive crosslinking brought about by the opening of the epoxy rings, another kind of organohydrogenpolysiloxane as will be defined in the following and referred to as component (b') hereinafter may be employed together with component (b).

Such component (b') should be miscible with all of the above-described components (a), (a') and (b) and have at least 2 hydrogen atoms directly bonded to the silicon atoms in one molecule but contain no epoxy or ester groups. Some examples of this component (b') are compounds having the following structural formulae.

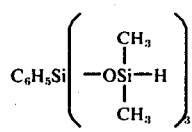

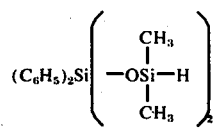

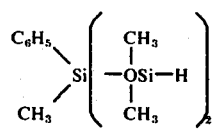

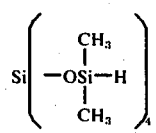

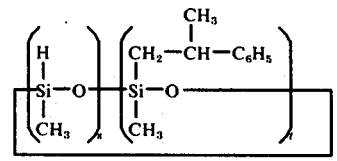

where $s$ and $t$ are positive integers satisfying the equations $s \geq 2$ and $t \geq 1$, respectivly, with the proviso that $3 \leq (s + t) \leq 6$.

When component (b') is employed in combination with component (b) in the formulation of the composition, its amount should be more than 5% by weight, preferably more than 30% by weight of the total amount of both component, while the total amount should be such that both components have an average of from 0.7 to 1.5 hydrogen atoms directly bonded to the silicon atoms per vinyl group contained in components (a) and (a'). If components (b) and (b') are used in an amount less than defined above, the resultant composition cured would have poor mechanical strengths due to insufficient cure, whereas an excessive amount used would result in bringing about brittleness to the cured compositions due to unduly high crosslinking density.

The platinum catalyst as component (c) useful in the compositions of this invention can be of the known form, as usually employed in hydrosilation. Its examples are chloroplatinic acid, alcohol-modified chloroplatinic acid, platinum-olefin complexes, platinum black and finely dispersed platinum metal as deposited on carrier, such as alumina or silica. Among them, chloroplatinic acid and platinum-olefin complexes may preferably be employed as solutions in various organic solvents, such as alcohols, ketones, ethers and hydrocarbons. It is preferred that the particle size of the platinum catalysts in solid form should be as fine as possible in order to have a good dispersibility and the specific surface areas of the carriers to bear the catalyst ingredients should be as large as possible.

The amount of the platinum component (c) to be added has no other limitation than that it is within a catalytic amount, although, preferably from the economical and technical points of view, it is from 1 to 30 p.p.m. by weight based on the total amount of components (a) and (a') in the case of a catalyst such as chloroplatinic acid which is miscible with the organopolysiloxanes, of from 20 to 500 p.p.m. by weight in the case of a solid catalyst such as platinum black, as calculated as platinum metal.

The composition of the present invention can be formulated by merely blending components (a), (b) and (c) and, optionally together with (a') and (b'), and the composition thus formulated can be cured by heating at an elevated temperature of from 50 to 150° C or higher. Generally, a higher curing velocity may be obtained by the addition of a larger amount of the platinum component (c) and by the application of a higher temperature. When the cured organosilicon composition to be obtained is a very thick one, two-step curing is recommended in order to reduce the internal stress after curing and to perform uniform curing throughout from the surface to deep section. The two-step curing process consists, for example, of a first step carried out at about 70° to 100° C over a period of several hours and a second step at 150° C for additional several hours.

Optionally, small amounts of some other types of organopolysiloxanes miscible with the organopolysiloxane components described above may be added to the composition of the invention, thereby to improve the flexibility and the thermal shock resistance of cured composition.

In addition to the above-described components, other materials may be present in the composition of the invention. Such materials are, for example, fillers such as fumed silica, quartz powder, glass fiber, carbon black, metal oxides including iron oxide and titanium dioxide, and metal carbonates including calcium carbonate and magnesium carbonate to prevent the shrinkage of the composition on cure, decrease the coefficient of thermal expansion and, at the same time, to improve thermal stability and mechanical strengths, though transparency is sacrificed; pigments or dyes as the coloring agents and oxidation inhibitors, if necessary.

The curable organosilicon composition of the invention has a sufficiently long pot life and is capable of imparting to the cured composition a high degree of transparency even at relatively high temperatures that has not successfully been attained with ordinary organic materials such as epoxy resins. Therefore, the composition of the invention can be used in the field where a high degree of transparency is required as in the coating of light-emission photodiodes. The composition of the invention is also useful in the manufacture of various kinds of electronic parts by utilizing its excellent adhesiveness to metal, glass and ceramic surfaces.

The following examples are provided to further illustrate the present invention. Parts in the examples are all parts by weight.

EXAMPLE 1

Into a 5-liter glass flask containing 2,100 g of water and 530 g of toluene was dropped a mixture composed of 698 g of phenyltrichlorosilane, 169 g of vinylmethyldichlorosilane, 194 g of dimethyldichlorosilane and 530 g of toluene under vigorous agitation over a period of 40 minutes, and the resulting mixture was then agitated for additional 30 minutes. After phase separation on standing, the lower aqueous layer was discarded, and the upper organic layer was washed with water to neutral. After completion of washing, the concentration of the organopolysiloxane in the toluene solution was adjusted to 60% and the solution was heated under reflux for 5 hours with addition of 0.15 g of potassium hydroxide to be polymerized by the dehydration condensation. Then, the alkali catalyst was neutralized by adding 0.6 g of trimethylchlorosilane with stirring for 60 minutes at room temperature. The toluene solution was filtered and toluene was stripped off by distillation under reduced pressure to produce 620 g of a liquid solventless and transparent organopolysiloxane resin (hereinafter referred to as the siloxane A).

The siloxane A having the viscosity of 7,000 centipoise at 150° C was composed of 55 mole % of $C_6H_5SiO_{1.5}$ units, 20 mole % of $(CH_2=CH)(CH_3)SiO$ units and 25 mole % of $(CH_3)_2SiO$ units and contained 0.01% by weight of residual silanolic hydroxy groups.

100 parts of this siloxane A as component (a) was blended with an organohydrogenpolysiloxane as component (b) having the structural formula

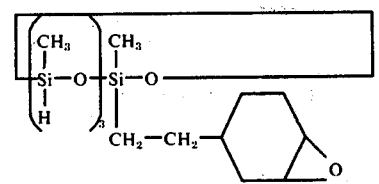

and an organohydrogenpolysiloxane as component (b') having the structural formula

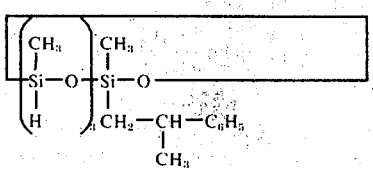
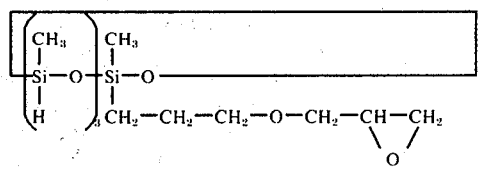

in varied amounts as indicated in Table I to follow. As the platinum catalyst component (c) was employed 13 parts of a mixture composed of 0.5% by weight of 2-ethylhexanol solution of chloroplatinic acid in the concentration of 2% as platinum metal and 99.5% by weight of a liquid solventless organopolysiloxane having the viscosity of 2,000 centipoise at 25° C composed of 20 mole % of $C_6H_5SiO_{1.5}$ units, 30 mole % of $(CH_2=CH)(CH_3)SiO$ units, 40 mole % of $(CH_3)(C_6H_5)SiO$ units and 10 mole % of $(CH_3)_2SiO$ units. The resultant composition had the viscosity of about 6,400 centipoise at 25° C.

Plates of aluminum or copper were coated with the compositions as prepared above, and heated stepwise at 100° C for 1 hour and at 150° C for 4 hours to make the compositions cured. Each cured composition was subjected to the shearing adhesion test. The results are shown also in Table I.

Table I

| | Test No. | Organohydrogen-polysiloxane | | Shearing adhesion kg/cm² | |
|---|---|---|---|---|---|
| | | Component (b),parts | Component (b'),parts | Aluminum | Copper |
| Present invention | 1-1 | 3 | 27 | 4.6 | — |
| | 1-2 | 9 | 21 | 5.8 | — |
| | 1-3 | 15 | 15 | 8.5 | 17 |
| Control | 1-4 | 0 | 30 | 1.1 | — |

Separately from the above shearing adhesion test, the same compositions were taken in glass dishes, subjected to curing by a similar stepwise heating treatment, and then cooled. It was witnessed that the sample of control test No. 1-4 was readily stripped of the cured layer off the dish surface, while the other samples of Test Nos. 1-1 to 1-3 according to the invention had the cured layer and the dish surface very strongly adhered and bonded to each other -- more strongly as component (b) is added in increased amounts.

Further, the cured composition of Test No. 1-3 was tested to determine the following properties with the values accompanying.

| Hardness (shore "D") | 79 |
|---|---|
| Flexural strength | 300 kg/cm² |
| Flexural modulus | 1.2 × 10⁴ kg/cm² |
| Volume resistivity | 1.3 × 10¹⁶ ohm-cm |

It is now observed that the above results clearly demonstrate an excellent adhesive strength possessed by the composition of the invention containing component(b).

EXAMPLE 2

An organohydrogenpolysiloxane with an epoxy group in the molecule, being component (b), having the structural formula and tris(dimethylhydrogensiloxy)phenylsilane being component (b') were blended in varied amounts as indicated in Table II. To each of these mixtures was added 100 parts of a resin-type organopolysiloxane being component (a) having the melt viscosity of 8,000 centipoise at 150° C, composed of 60 mole % of $C_6H_5SiO_{1.5}$ units, 30 mole % of $(CH_2=CH)(CH_3)SiO$ units and 10 mole % of $(CH_3)_2SiO$ units. As the platinum catalyst component (c), 13 parts of a mixture of 0.5% by weight of 2-ethylhexanol-modified chloroplatinic acid (prepared according to the method of U.S. Pat. No. 3,220,972) containing 2% of platinum as metal and 99.5% by weight of a liquid solventless organopolysiloxane with the viscosity of 35,000 centipoise at 25° C composed of 50 mole % of $C_6H_5SiO_{1.5}$ units, 30 mole % of $(CH_2=CH)(CH_3)SiO$ units, 15 mole % of $(CH_3)_2SiO$ units and 5 mole % of $(CH_3)_3SiO_{0.5}$ units was then added.

Steel plates were coated with the thus prepared compositions and heated stepwise at 80° C for 2 hours and at 150° C for 6 hours to make the compositions cured and each of the cured compositions was then subjected to the shearing adhesion test, and the results are shown in Table II.

Table II

| | Sample No. | Organohydrogen-polysiloxane | | Shearing adhesion kg/cm² |
|---|---|---|---|---|
| | | Component (b),parts | Component (b'),parts | Steel |
| Present invention | 2-1 | 10 | 24 | 5.3 |
| | 2-2 | 17 | 17 | 7.1 |
| | 2-3 | 24 | 10 | 8.1 |
| Control | 2-4 | 0 | 34 | 0 (spontaneously stripped off) |

Further, the cured composition of Test No. 2-3 was tested to determine the following properties with the values accompanying.

| Hardness (Shore "D") | 80 |
|---|---|
| Flexural strength | 310 kg/cm² |
| Flexural modulus | 1.3 × 10⁴ kg/cm² |
| Transmission of light (thickness 10 mm, wavelength 700 nm) | 92% |
| Dielectric constant (100 kHz) | 3.00 |
| Dielectric tangent (100 kHz) | 0.0013 |

The above results clearly indicate that the compositions of the present invention when cured possess excellent adhesiveness to the metal surface as well as superior transparency and electrical properties.

EXAMPLE 3

A composition was prepared by blending the following: (1) 100 parts of the siloxane A of Example 1 as component (a), (2) 10 parts of an organopolysiloxane fluid having a viscosity of 22 centipoise at 25° C, composed of 40 mole % of $(CH_2=CH)(C_6H_5)(CH_3)SiO_{0.5}$ units, 40 mole % of $(CH_3)(C_6H_5)SiO$ units and 20 mole % of $(CH_2=CH)(CH_3)SiO$ units, as component (a'), (3) 15 parts of the same epoxy-containing organohydrogenpolysiloxane as employed in Example 2, as component (b), (4) 15 parts of the same tris(dimethylhydrogensiloxy)phenylsilane as employed in Example 2, as component (b'), (5) 0.1 part of a benzene solution of ethylene-platinous chloride $(C_2H_4PtCl_2)_2$ containing 0.5% of platinum as metal and (6) 0.1 part of 2-ethynylisopropanol. The thus prepared organosilicon composition had a viscosity of about 1,600 centipoise at 40° C and its pot life was found about one month, sufficiently long from the practical point of view.

This composition was applied to a copper plate, followed by heating at 150° C for 8 hours to cure. The adhesion between the cured layer and the copper surface was in good conditions, and their shearing adhesion was found to have a value of 13.7 kg/cm².

EXAMPLE 4

A composition was prepared by blending the following: (1) 100 parts of a resin-type organopolysiloxane composed of 40 mole % of $C_6H_5SiO_{1.5}$ units, 30 mole % of $CH_3SiO_{1.5}$ units, 10 mole % of $(CH_2=CH)(CH_3)SiO$ units and 20 mole % of $(CH_3)_2SiO$ units, as component (a), (2) 10.6 parts of an ester group-containing organohydrogenpolysiloxane having the structural formula

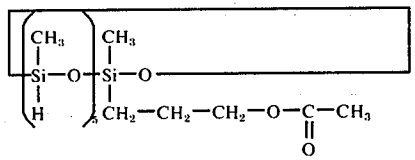

as component (b), and (3) 0.05 part of the same 2-ethylhexanol-modified chloroplatinic acid as employed in Example 2, as component (c). This composition was applied to a chromium-plated steel plate, followed by heating at 150° C for 17 hours to cure. The adhesion between the cured layer and the metal surface was in good conditions, and the shearing adhesion was found to have a value of 10.5 kg/cm².

EXAMPLE 5

A composition was prepared by blending the following: (1) 100 parts of a resin-type organopolysiloxane composed of 70 mole % of $CH_3SiO_{1.5}$ units, 10 mole % of $(CH_2=CH)(CH_3)SiO$ units and 20 mole % of $(CH_3)_2SiO$ units, as component (a), (2) 25.1 parts of an ester group-containing organohydrogenpolysiloxane having the structural formula

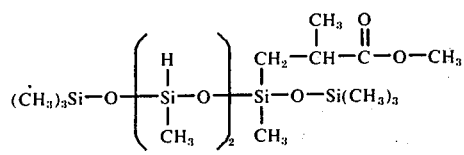

as component (b), and (3) 0.05 part of the same platinum catalyst as employed in Example 2, as component (c). The composition was applied to a stainless steel plate, followed by heating at 150° C for 17 hours to cure. The adhesion between the cured layer and the metal surface was good and the value of the shearing adhesion was found to be 6.0 kg/cm².

EXAMPLE 6

A composition was prepared by blending the following: (1) 100 parts of a resin-type organopolysiloxane composed of 40 mole % of $C_6H_5SiO_{1.5}$ units, 10 mole % of $CH_3SiO_{1.5}$ units, 45 mole % of $(CH_3)_2SiO$ units and 5 mole % of $(CH_2=CH)(CH_3)_2SiO_{0.5}$ units, as component (a), (2) 1 part of a linear organopolysiloxane composed of 15 mole % of $(C_6H_5)_2SiO$ units, 10 mole % of $(CH_2=CH)(CH_3)SiO$ units, 65 mole % of $(CH_3)_2SiO$ units and 10 mole % of $(C_6H_5)_2(CH_3)SiO_{0.5}$ units, as component (a'), (3) 8 parts of an epoxy group-containing organohydrogenpolysiloxane having the structural formula

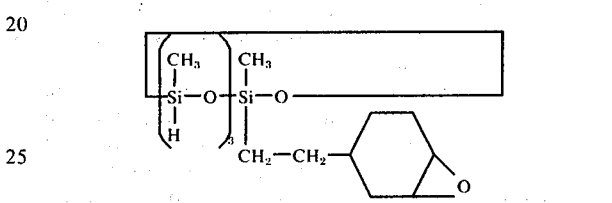

as component (b) and (4) 0.05 part of the same 2-ethylhexanol-modified chloroplatinic acid as employed in Example 2, as component (c), and (5) 30 parts of silica powder with the average particle diameter of 5 μm. The gelation time of the thus prepared composition was 4 hours at room temperature.

On the other hand, another organopolysiloxane composition was prepared by the same formulation as above but with the omission of the linear organopolysiloxane component (a'). The gelation time of this composition was as short as 5 minutes at room temperature.

EXAMPLE 7

Compositions 7-1 to 7-4 were prepared by blending 100 parts of an organopolysiloxane identical to the siloxane A of Example 1 except its residual hydroxy content being 0.5% by weight and its melt viscosity being 800 centipoise at 150° C, as component (a), with the same components (b) and (b') as employed in Example 1 and the platinum catalyst component (c) of Example 2 in the presence or absence of the linear orgaopolysiloxanes as specified in the following Table III, as component (a') and quartz powder, the amounts of these materials used being indicated in the same table.

The viscosity of each composition thus prepared and the properties of the composition cured at 150° C for 16 hours are shown in the Table. The values of the shearing adhesion are what were obtained with nickel-plated steel plates.

Table III

|  | Composition | | | |
|---|---|---|---|---|
|  | 7-1 | 7-2 | 7-3 | 7-4 |
| Component (a), parts | 100 | 100 | 100 | 100 |
| Component (b), parts | 9.2 | 10 | 10 | 10 |
| Component (b'), parts | 13.5 | 15 | 15 | 15 |
| Platinum catalyst component (c), parts | 0.03 | 0.03 | 0.03 | 0.03 |
| Component (a'): | | | | |
| Average formula A*, parts | 0 | 25 | 25 | 0 |
| Average formula B**, parts | 0 | 0 | 0 | 50 |

Table III-continued

| | Composition | | | |
|---|---|---|---|---|
| | 7-1 | 7-2 | 7-3 | 7-4 |
| Quartz powder, parts | 0 | 0 | 150 | 0 |
| Viscosity, cp. at 25° C | 7600 | 4000 | 26500 | 5000 |
| Hardness (Shore "D") | 79 | 75 | 83 | 60 |
| Flexural strength, kg/cm² | 260 | 250 | 350 | — |
| Shearing adhesion, kg/cm² | 9.9 | 12.0 | 7.3 | 11.5 |
| Coefficient of thermal expansion, cm/cm/° C, × 15⁻⁵ | 16.2 | 20.0 | 9.8 | — |

\*
$$CH_2=CH-\underset{\underset{CH_3}{|}}{\overset{\overset{CH_3}{|}}{Si}}-O\left(\underset{\underset{CH_3}{|}}{\overset{\overset{CH_3}{|}}{Si}}-O\right)_{19}\left(\underset{\underset{C_6H_5}{|}}{\overset{\overset{C_6H_5}{|}}{Si}}-O\right)_{2}\underset{\underset{CH_3}{|}}{\overset{\overset{CH_3}{|}}{Si}}-CH=CH_2$$

\*\*
$$CH_2=CH-\underset{\underset{CH_3}{|}}{\overset{\overset{CH_3}{|}}{Si}}-O\left(\underset{\underset{CH_3}{|}}{\overset{\overset{CH_3}{|}}{Si}}-O\right)_{38}\left(\underset{\underset{C_6H_5}{|}}{\overset{\overset{C_6H_5}{|}}{Si}}-O\right)_{15}\underset{\underset{CH_3}{|}}{\overset{\overset{CH_3}{|}}{Si}}-CH=CH_2$$

Each of these four compositions was poured into an aluminum dish 60 mm in diameter and 10 mm deep, with a hexagonal brass nut having the dimensions of 25 mm in outer diameter and 12.5 mm high in the center. The compositions were heated at 150° C for 16 hours to cure, with the nut embedded therein.

The cured samples thus obtained were tested for thermal shock resistance by heating to 150° C and then cooling in water at 20° C, this heating-cooling cycle being repeated twice. As a result, the sample from composition 7-1 exhibited a large crack formed at the edge of the nut and the samples from compositions 7-2 to 7-4 had no cracking at all, while no loss of adhesion of the cured layers to the nuts was observed with all the samples.

A further thermal shock test was conducted on each sample by repeating twice the heating-cooling cycle between 200° C and 20° C. According to the results, the cured layer from composition 7-1, having more than 10 cracks of large and small sizes formed therein, became detached from the aluminum dish surface; that from composition 7-2 had no cracks formed but became detached from the dish surface; that from composition 7-3 had no cracks formed nor loss of adhesion; and that from composition 7-4, having two large cracks formed at the edges of the nut, became partly detached from the dish surface.

It can be concluded from the above that the addition of the linear organopolysiloxane component (a′) is effective for preventing the formation of cracks in the cured composition.

What is claimed is:
1. An organosilicon composition comprising
   a. an organopolysiloxane composed of from 15 to 75 mole % of the organosiloxane units represented by the general formula $R^1SiO_{1.5}$, from 25 to 85 mole % of the organosiloxane units represented by the general formula $R^2R^3SiO$ and from 0 to 5 mole % of the organosiloxane units represented by the general formula $R^4R^5R^6SiO_{0.5}$, where $R^1$, $R^2$, $R^3$, $R^4$, $R^5$ and $R^6$ each are the same or different monovalent hydrocarbon groups, from 2.0 to 40 mole % of said hydrocarbon groups being vinyl groups,
   b. an organohydrogenpolysiloxane miscible with component (a), having from 2 to 6 silicon atoms in one molecule, at least 2 hydrogen atoms directly bonded to silicon atoms in one molecule and at least one of the groups selected from epoxy and ester groups bonded to the silicon atoms through carbon atoms in one molecule, in an amount such that its hyrogen atoms directly bonded to the silicon atoms are from 0.7 to 1.5 times the equimolar amount of the vinyl groups contained in component (a),
   c. catalytic amount of platinum or a platinum compound.
2. The organosilicon composition as claimed in claim 1 wherein the content of residual hydroxy groups directly bonded to the silicon atoms in component (a) is not exceeding 2.0 % by weight of component (a).
3. The organosilicon composition as claimed in claim 1 wherein said hydrocarbon groups $R^1$, $R^2$, $R^3$, $R^4$, $R^5$ and $R^6$ are selected from the class consisting of methyl, ethyl, vinyl and phenyl groups.
4. The organosilicon composition as claimed in claim 1 wherein component (b) contains less than 7 silicon atoms per molecule.
5. The organosilicon composition as claimed in claim 1 wherein component (c) is selected from the class consisting of chloroplatinic acid, chloroplatinic acid modified with alcohols and platinum-olefin complexes.
6. The organosilicon composition as claimed in claim 1 wherein component (c) is used in an amount of from 1 to 30 p.p.m. as platinum metal based on the amount of component (a).
7. The organosilicon composition as claimed in claim 1 wherein (a′) an organopolysiloxane miscible with component (a), having at least one vinyl group directly bonded to silicon atoms in one molecule, represented by the general formula

$$R^8-\underset{\underset{R^9}{|}}{\overset{\overset{R^7}{|}}{Si}}-O\left(\underset{\underset{R^{11}}{|}}{\overset{\overset{R^{10}}{|}}{Si}}-O\right)_{n}\underset{\underset{R^9}{|}}{\overset{\overset{R^7}{|}}{Si}}-R^8$$

where $R^7$, $R^8$, $R^9$, $R^{10}$ and $R^{11}$ are each the same or different monovalent hydrocarbon groups and n is an integer from 0 to 50, is additionally added in an amount of from 0.1 to 50 parts by weight per 100 parts by weight of component (a), the amount of component (b) being such that its hydrogen atoms directly bonded to the silicon atoms are from 0.7 to 1.5 times the equimolar amount of the vinyl groups contained in components (a) and (a′).
8. The organosilicon composition as claimed in claim 1 wherein (b′) an organohydrogenpolysiloxane miscible with components (a) and (b), having from 2 to 6 silicon atoms in one molecule and at least 2 hydrogen atoms directly bonded to silicon atoms in one molecule but containing no epoxy or ester groups is additionally added in an amount equal to from 5 to 95% of the total weight of component (b) and (b′), the total amount of components (b) and (b′) being such that their hydrogen atoms directly bonded to the silicon atoms being from 0.7 to 1.5 times the equimolar amount of the vinyl groups contained in component (a).
9. The organosilicon composition as claimed in claim 1 wherein both components (a′) and (b′) are additionally added in the amounts such that component (a') is from 0.1 to 50 parts by weight per 100 parts by weight of component (a) and component (b') is from 5 to 95% of the total weight of components (b) and (b'), the total amount of components (b) and (b') is such that their hydrogen atoms directly bonded to the silicon atoms being from 0.7 to 1.5 times the quimolar amount of the vinyl groups contained in components (a) and (a').

10. The organosilicon composition as claimed in claim 7 wherein said monovalent hydrocarbon groups $R^7$, $R^8$, $R^9$, $R^{10}$ and $R^{11}$ are selected from the class consisting of methyl, ethyl, vinyl and phenyl groups.

11. The organosilicon composition as claimed in claim 7 wherein component (a') is a linear organopolysiloxane having 2 vinyl groups each bonded directly to the terminal silicon atoms in one molecule.

* * * * *